United States Patent
Wang et al.

(10) Patent No.: US 12,147,365 B2
(45) Date of Patent: Nov. 19, 2024

(54) DATA PROCESSING METHOD, APPARATUS AND STORAGE MEDIUM

(71) Applicant: SUZHOU CENTEC COMMUNICATIONS CO., LTD., Jiangsu (CN)

(72) Inventors: Dong Wang, Jiangsu (CN); Wei He, Jiangsu (CN); Bin Zhu, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 0 days.

(21) Appl. No.: 17/767,935

(22) PCT Filed: Nov. 12, 2019

(86) PCT No.: PCT/CN2019/117692

§ 371 (c)(1),
(2) Date: Apr. 11, 2022

(87) PCT Pub. No.: WO2021/068335

PCT Pub. Date: Apr. 15, 2021

(65) Prior Publication Data

US 2024/0104042 A1 Mar. 28, 2024

(30) Foreign Application Priority Data

Oct. 11, 2019 (CN) .......................... 201910962889.4

(51) Int. Cl.
*G06F 13/40* (2006.01)

(52) U.S. Cl.
CPC .................. *G06F 13/4004* (2013.01)

(58) Field of Classification Search
CPC .................................................. G06F 13/4004
See application file for complete search history.

(56) References Cited

U.S. PATENT DOCUMENTS 8,687,629 B1 * 4/2014 Kompella ........... H04L 49/1515
710/316
8,953,606 B1 * 2/2015 McGlaughlin ........ H04L 49/357
455/226.1

(Continued)

FOREIGN PATENT DOCUMENTS

| CN | 1633103 A | 6/2005 |
|---|---|---|
| CN | 101227291 A | 7/2008 |
| CN | 106612220 A | 5/2017 |

*Primary Examiner* — Henry Tsai
*Assistant Examiner* — Harry Z Wang
(74) *Attorney, Agent, or Firm* — Samson G. Yu

(57) ABSTRACT

A data processing method, a data processing apparatus and a storage medium. The data processing method includes: receiving first data comprising at least one piece of second data (S101); transmitting the at least one piece of second data to at least one first data transmission channel (S102); sending, according to link cross information of a Printed Circuit Board (PCB), data of the at least one first data transmission channel to at least one corresponding data transmission link (S103); respectively receiving at least one piece of third data based on at least one port (S401); and sending, according to a channel identifier of request information, the at least one piece of third data to a corresponding data reconstitution link (S402).

11 Claims, 7 Drawing Sheets

(56) References Cited

U.S. PATENT DOCUMENTS

| | | | |
|---|---|---|---|
| 2009/0196287 A1* | 8/2009 | Yu | H04L 12/40032 |
| | | | 370/389 |
| 2013/0201316 A1* | 8/2013 | Binder | H04L 67/12 |
| | | | 701/2 |
| 2014/0016636 A1* | 1/2014 | Prodan | H04L 12/2801 |
| | | | 370/389 |
| 2015/0003466 A1* | 1/2015 | Soffer | H04L 47/125 |
| | | | 370/412 |
| 2015/0019748 A1* | 1/2015 | Gross, IV | H04L 47/36 |
| | | | 709/230 |
| 2015/0180782 A1* | 6/2015 | Rimmer | H04L 49/112 |
| | | | 370/235 |
| 2016/0294990 A1 | 10/2016 | Cao | |

* cited by examiner

DATA PROCESSING METHOD, APPARATUS AND STORAGE MEDIUM

CROSS REFERENCE

This application is a National Stage Filing of the PCT International Application No. PCT/CN2019/117692 filed on Nov. 12, 2019, which claims priority to Chinese Application No. 201910962889.4 filed on Oct. 11, 2019, the entirety of which is herein incorporated by reference.

TECHNICAL FIELD

The present disclosure relates to the technical field of electronics, and particularly to a data processing method, apparatus and a storage medium.

BACKGROUND

Physical links may cross on a Printed Circuit Board (PCB) of a chip. Therefore, how to implement anti-cross between respective data transmission links and respective physical link ports inside a switching chip so as to ensure a one-to-one correspondence between the physical link ports and the data transmission links is a technical problem to be solved.

SUMMARY

Embodiments of the present disclosure provide a data processing method, apparatus and a storage medium, which can ensure that physical link ports are still in one-to-one correspondence with data transmission links of a chip when there is a link cross on a PCB of the chip.

According to a first aspect, the embodiments of the present disclosure provide a data processing method, which may include the following operations.

First data including at least one piece of second data is received.

The at least one piece of second data is transmitted to at least one first data transmission channel.

Data of the at least one first data transmission channel is sent to at least one corresponding data transmission link according to link cross information of a PCB.

In the above-mentioned solution, the link cross information of the PCB may include:

a corresponding relationship between the data transmission link and the physical link port.

In the above-mentioned solution, the method may further include the following operations.

A channel identifier of the at least one first data transmission channel is configured according to the link cross information of the PCB.

In the above-mentioned solution, the operation of transmitting the at least one piece of second data to the at least one first data transmission channel may include the following operations.

The second data is transmitted to a first data transmission channel matching a channel identifier of the second data.

In the above-mentioned solution, the method may further include the following operations.

A link identifier of the at least one data transmission link is configured according to the link cross information of the PCB.

In the above-mentioned solution, the operation of configuring the link identifier of the at least one data transmission link according to the link cross information of the PCB may include the following operations.

In a case where the link cross information of the PCB is that an mth data transmission link corresponds to an nth physical link port, a link identifier of the mth data transmission link is configured to match a port identifier of the nth physical link port so as to enable data of the mth data transmission link to be transmitted to the nth physical link port.

Herein, the m and n are both positive integers.

In the above-mentioned solution, the operation of sending the data of the at least one first data transmission channel to the at least one corresponding data transmission link may include the following operations.

The second data is sent to a data transmission link matching a link identifier of the second data.

According to a second aspect, the embodiments of the present disclosure provide a data processing method, which may include the following operations.

At least one piece of third data is received based on at least one port.

The at least one piece of third data is sent to a corresponding data reconstitution link according to a channel identifier and a link identifier of the third data.

In the above-mentioned solution, the method may further include the following operations.

A channel identifier of at least one second data transmission channel which receives the at least one piece of third data is configured according to the channel identifier of the third data.

In the above-mentioned solution, the operation of sending the at least one piece of third data to the corresponding data reconstitution link according to the channel identifier and the link identifier of the third data may include the following operations.

According to the channel identifier carried in request information sent by the data reconstitution link, data of at least one second data transmission channel matching the channel identifier of the request information is sent to the data reconstitution link which sends the request information.

According to a third aspect, the embodiments of the present disclosure provide a data processing apparatus, which may include a first receiving unit, a data strobe unit, and a data distribution unit.

The first receiving unit is adapted to receive first data including at least one piece of second data.

The data strobe unit is adapted to transmit the at least one piece of second data to at least one first data transmission channel.

The data distribution unit is adapted to send data of the at least one first data transmission channel to at least one corresponding data transmission link according to link cross information of a PCB.

In the above-mentioned solution, the apparatus may further include a configuration unit.

The configuration unit is adapted to configure a channel identifier of the at least one first data transmission channel according to the link cross information of the PCB.

In the above-mentioned solution, the data strobe unit is further adapted to perform the following operations.

The second data is transmitted to a first data transmission channel matching a channel identifier of the second data.

In the above-mentioned solution, the configuration unit is further adapted to perform the following operations.

A link identifier of the at least one data transmission link is configured according to the link cross information of the PCB.

In the above-mentioned solution, the configuration unit is adapted to configure, in a case where the link cross information of the PCB is that an mth data transmission link corresponds to an nth physical link port, a link identifier of the mth data transmission link to match a port identifier of the nth physical link port so as to enable data of the mth data transmission link to be transmitted to the nth physical link port.

Herein, the m and n are both positive integers.

In the above-mentioned solution, the data distribution unit is adapted to send the second data to a data transmission link matching a link identifier of the second data.

According to a fourth aspect, the embodiments of the present disclosure provide a data processing apparatus, and the apparatus may include a second receiving unit and a data caching unit.

The second receiving unit is adapted to respectively receive at least one piece of third data based on at least one port.

The data caching unit is adapted to send at least one piece of third data to a corresponding data reconstitution link according to a channel identifier and a link identifier of the third data.

In above-mentioned solution, the apparatus may further include: a configuration unit, adapted to configure, according to the channel identifier of the third data, a channel identifier of at least one second data transmission channel which receives the at least one piece of third data.

The data caching unit is further adapted to transmit the third data to a second data transmission channel matching a channel identifier of the third data.

In the above-mentioned solution, the data caching unit is further adapted to send, according to the channel identifier carried in request information sent by the data reconstitution link, data of at least one second data transmission channel matching the channel identifier of the request information to the data reconstitution link which sends the request information.

The apparatus may further include: a data reconstitution unit, adapted to send the request information to the data caching unit, and adapted to reconstitute the at least one piece of third data according to the link identifier of the at least one piece of third data.

The embodiments of the present disclosure further provide a data processing apparatus, including a memory, a processor and an executable program which is stored on the memory and can be run by the processor. When running the executable program, the processor implements the steps of the data processing method.

The embodiments of the present disclosure provide a data processing method, apparatus and a storage medium. The first data including at least one piece of second data is received; the at least one piece of second data is transmitted to at least one first data transmission channel; and according to the link cross information of the PCB, data of the at least one first data transmission channel is sent to at least one corresponding data transmission link. It is enabled that in the case where the physical link of a chip has a link cross on the PCB of the chip, when the chip transmits data to the physical link ports of other modules on the PCB, a one-to-one correspondence between the data transmission links inside the chip and the physical link ports of other modules on the PCB can still be ensured. At least one piece of third data is received; and data of the at least one second data transmission channel is sent to a corresponding data reconstitution link according to a channel identifier of the request information. It is enabled that in the case where the physical link of a chip has a link cross on the PCB of the chip, when the chip receives data of other modules on the PCB, a one-to-one correspondence between the data transmission links inside the chip and the physical link ports of other modules on the PCB can still be ensured. The data processing method provided by the embodiments of the present disclosure is high in scalability, and is also applicable in a chip with multiple data transmission channels and multiple data transmission links. Furthermore, the data processing method provided by the embodiments of the present disclosure does not introduce a data logical link, and thus does not increase the burden of a chip data selection module, and does not increase the complexity of real-time clock tree analysis at the back-end of a chip because of a clock of the data logical link.

DETAILED DESCRIPTION OF THE EMBODIMENTS

The present disclosure is further described below in detail with reference to accompanying drawings and embodiments. It is to be understood that the specific embodiments described herein are only used to explain the present disclosure, and are not used to limit the present disclosure.

As the demand for bandwidth on the Internet increases, the bandwidth supported by switching chips also increases. Current switching chips may provide 12.8 Terabyte (T) of In/Out (IO) switching bandwidth. The switching chip, which may provide 12.8 T bandwidth, includes 256 physical links supporting 56 Gigabyte (G) switching bandwidth and may support up to 128 physical link ports with 100 G switching bandwidth.

In the implementation process, with the increase of physical links, cross-routing may occur in both cassette device application and rack device application, thereby causing physical link crosstalk, and it is impossible to ensure that physical links correspond to physical link ports one by one.

In the related art, a logical link is generally added inside a switching chip according to a PCB cross situation. However, as the number of data transmission links increases, the scalability of the above-mentioned solution is not high, and the PCB cross brought by the increase of data transmission links cannot be flexibly supported. Meanwhile, the logical link may cause an increase of an internal clock unit of the chip, which leads to the complexity of real-time clock tree analysis at the back-end of the chip.

Figure 1:
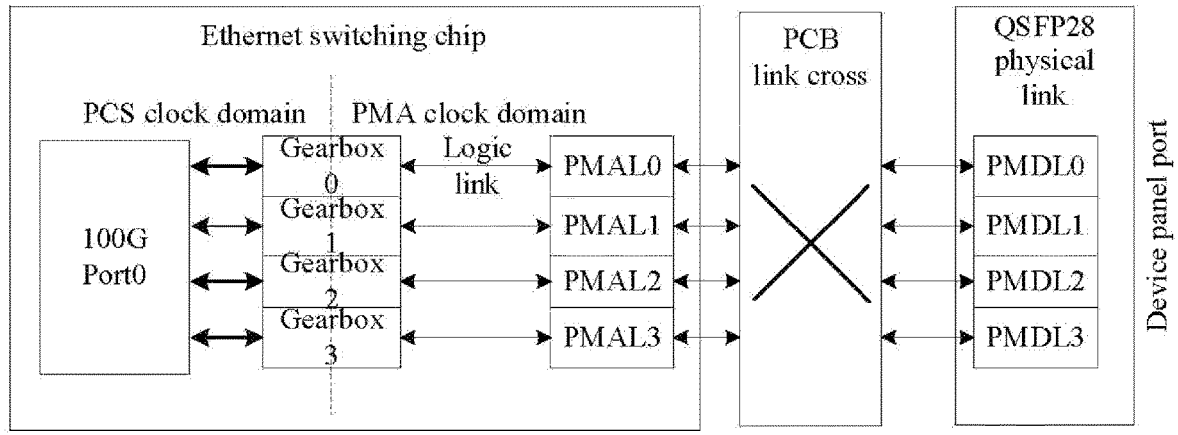
FIG. 1 is a schematic diagram I of a link connection between an Ethernet switching chip and a Quad Small Form-factor Pluggable (QSFP) optical module on a PCB.

FIG. 1 shows a schematic diagram I of a link connection between an Ethernet switching chip and a QSFP optical module on a PCB.

In some alternative embodiments, the QSFP is model QSFP28, including four physical links supporting 25 G switching bandwidth.

As shown in FIG. 1, the QSFP28 optical module includes four Physical Media Dependence Lanes (PMDL), which are PMDL0_TX to PMDL3_TX, respectively.

When the channel in the Ethernet switching chip is a channel (Port) supporting 100 G switching bandwidth, the channel includes 4 links, equal to the number of channels of the QSFP28. At this moment, a Physical Coding Sublayer (PCS) of a channel supporting 100 G bandwidth inside the switching chip supports link reconstitution after a link cross, and the situation that a physical link does not match a physical link port does not occur. That is, when there is only one channel in the Ethernet switching chip, and the number of links contained in the channel is consistent with the number of physical link ports of a device panel port, the situation that the physical links and the physical link ports cannot correspond one by one due to the link cross does not occur.

Figure 2:
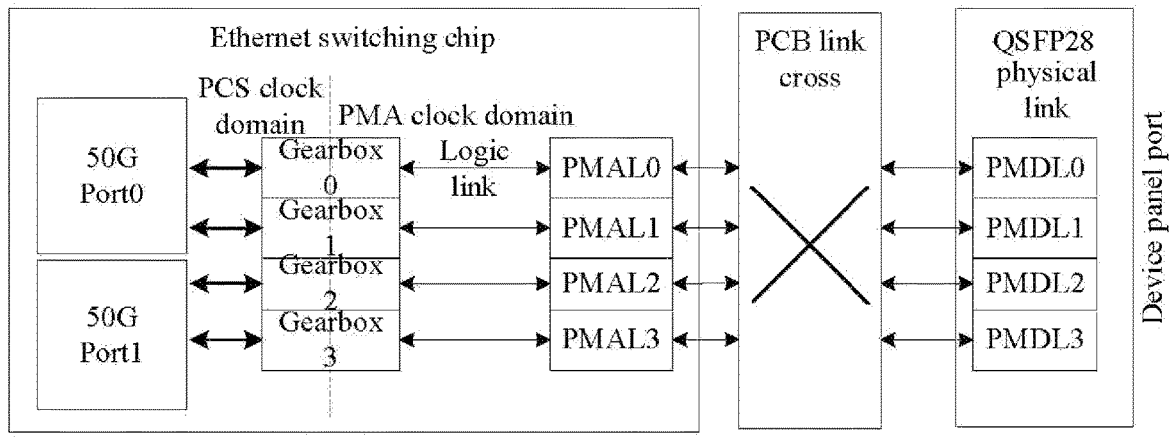
FIG. 2 is a schematic diagram II of a link connection between an Ethernet switching chip and a QSFP optical module on a PCB.

FIG. 2 shows a schematic diagram II of a link connection between an Ethernet switching chip and a QSFP optical module on a PCB.

In some alternative embodiments, the QSFP is model QSFP28, including four physical links supporting 25 G switching bandwidth.

When the channel in the Ethernet switching chip is a channel Port0 and a channel Port1 supporting 50 G switching bandwidth, both the Port0 and the Port1 contain 2 links. The two links of the Port0 are connected to the PMDL0_TX physical link port and the PMDL1_TX physical link port at the device panel port. The two links of the Port1 are connected to the PMDL2_TX physical link port and the PMDL3_TX physical link port at the device panel port. If there is a cross in the PCB link, it needs to ensure that the two links of the Port0 are still connected to the PMDL0_TX physical link port and the PMDL1_TX physical link port at the device panel port and that the two links of the Port1 are still connected to the PMDL2_TX physical link port and the PMDL3_TX physical link port at the device panel port.

Figure 3:
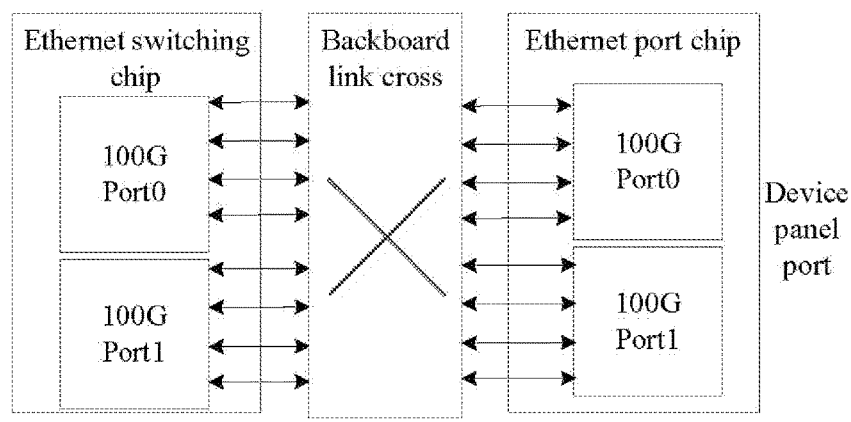
FIG. 3 is a schematic diagram of a link connection between an Ethernet switching chip and an Ethernet interface chip on a backboard.

FIG. 3 shows a schematic diagram of a link connection between an Ethernet switching chip and an Ethernet interface chip on a backboard.

As shown in FIG. 3, the channel in the Ethernet switching chip is a channel Port0 and a channel Port1 supporting 100 G switching bandwidth, and each channel contains 4 links. If the 8 links of the Ethernet switching chip and the 8 links of the Ethernet interface chip are not connected in a one-to-one correspondence but in cross connections, additional anti-cross logic needs to be added within the Ethernet switching chip in order to avoid the cross connections.

Figure 4:
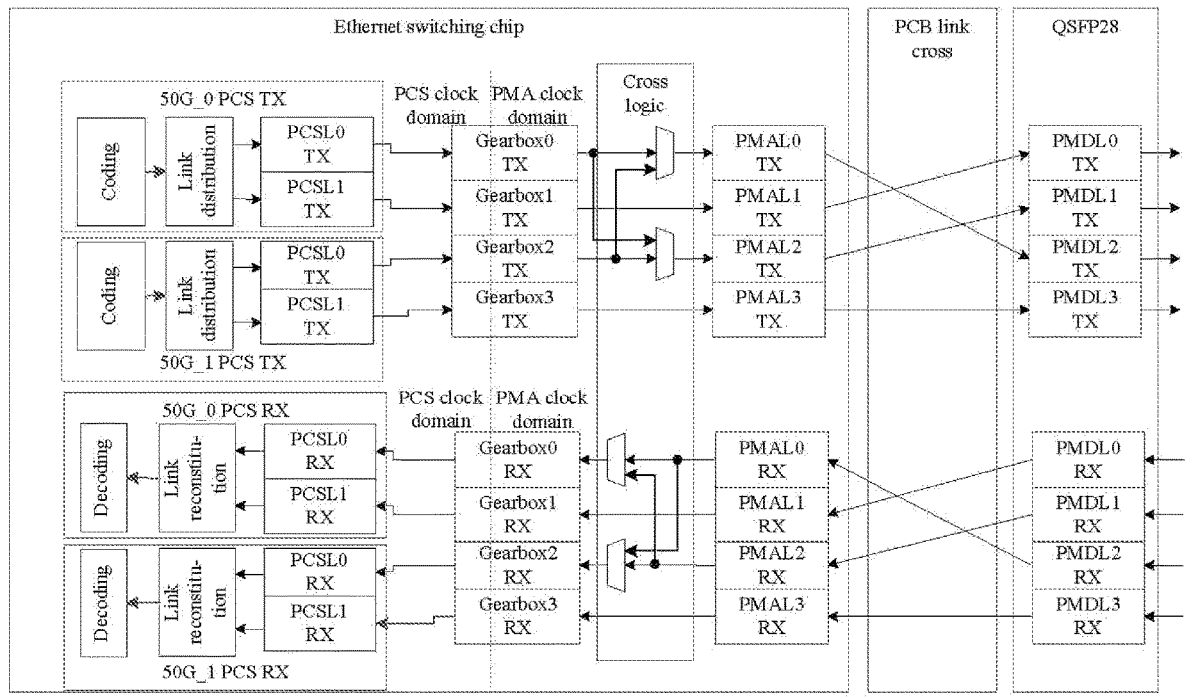
FIG. 4 is a schematic diagram of a chip connection structure for implementing PCB link anti-cross in a prior art.

FIG. 4 shows a schematic diagram of a chip connection structure for implementing PCB link anti-cross in the prior art.

As shown in FIG. 4, the channel in the Ethernet switching chip is a channel Port0 and a channel Port1 supporting 50 G switching bandwidth, and each channel contains 2 links.

The link cross information of the PCB is that a Physical Medium Attachment Lane (PMAL) 0 of the Ethernet switching chip is connected to the PMDL2_TX physical link port of the QSFP28 optical module, PMAL1_TX is connected to the PMDL0_TX physical link port of the QSFP28 optical module, PMAL2_TX is connected to the PMDL1_TX physical link port of the QSFP28 optical module, and PMAL3_TX is connected to the PMDL3_TX physical link port of the QSFP28 optical module. In order to enable the Ethernet switching chip to support the link cross on the PCB when connecting with the QSFP28 optical module, and ensure that two links of each 50 G bandwidth inside the Ethernet switching chip are respectively connected with the PMDL0_TX physical link port, the PMDL1_TX physical link port, the PMDL2_TX physical link port and the PMDL3_TX physical link port, it is necessary to add data selection logic to a sending direction PMAL clock domain inside the Ethernet switching chip between a Gearbox and the PMAL according to the situation of link cross on the PCB. The data selection logic selects not only the data, but also the clock used by each Gearbox selects the clock of the PMAL link connected thereto, thereby implementing an anti-cross process.

However, as the number of physical links increases, the data selection logic is more complex to implement the anti-cross links. As a result, the data selection logic needs to make more data selections, which greatly increases the cost. Meanwhile, the data selection logic may also introduce more clocks, increasing the complexity of real-time clock tree analysis at the back-end of the Ethernet switching chip.

With regard to the problems existing in the current method for implementing link anti-cross, the present disclosure proposes a data processing method, which can solve the technical problems and disadvantages which cannot be solved in the solutions of the prior art.

Figure 5:
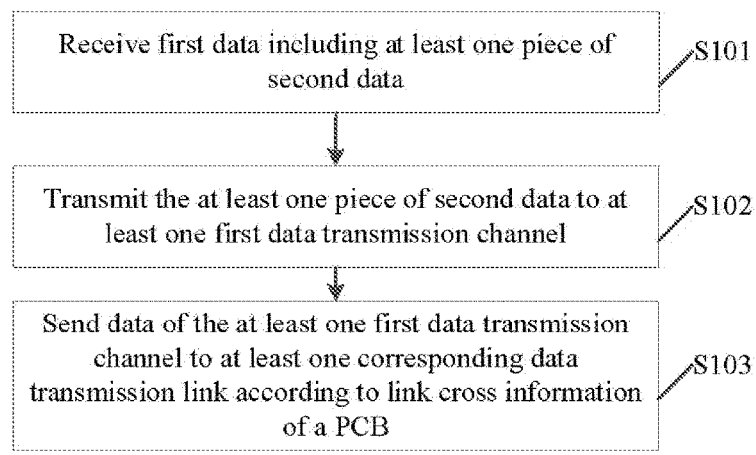
FIG. 5 is an alternative flowchart for sending data by a chip in a data processing method according to an embodiment of the present disclosure.

FIG. 5 is an alternative flowchart of a sending end in a data processing method according to the present disclosure.

At S101, first data including at least one piece of second data is received.

In some embodiments, a chip receives the first data including the at least one piece of second data. The second data is data sent by a link contained in an internal chip channel, and the first data is a set of all the second data.

In other embodiments, each first data transmission channel of the chip receives the first data including the at least one piece of second data, the first data transmission channel being a channel for transmitting data in the chip, the first data transmission channel corresponding to at least one data transmission link, and the number of the data transmission links being the total number of links contained in all internal chip channels that transmit the first data.

In some embodiments, the numbers of data transmission links corresponding to the first data transmission channels contained in the chip are equal.

For example, if there are two first data transmission channels in the chip and the first first data transmission channel corresponds to two data transmission links, the second first data transmission channel corresponds to two data transmission links as well.

In some embodiments, the first data is total data sent by all channels of the chip. The first data is sent to all first data transmission channels of the chip in a broadcasting manner.

In some embodiments, the first data further includes: channel information corresponding to a channel that sends each piece of the first data. The channel information may be a channel identifier. The second data carries a channel identifier of a channel that sends the second data.

In other embodiments, the first data further includes: link information corresponding to a link that sends each piece of the first data. The link information may be a link identifier. The second data carries a link identifier of a link that sends the second data.

Taking FIG. 2 as an example, there are two 50 G PCS channels in the chip, each 50 G PCS channel sends M/2 pieces of data, and the first data is the total M pieces of data sent by the two 50 G PCS channels, and the channel identifier of the channel that sends the data and/or the link identifier of the link that sends the data. The number of first data transmission channels of the chip is four, and each first data transmission channel receives M pieces of data, and the channel identifier and/or link identifier that corresponds to each piece of the M pieces of data and sends the data.

In some alternative embodiments, the first data may also be the total data after the data sent by all channels on a system side is subjected to Time Division Multiplexing (TDM) coding. Taking FIG. 2 as an example, the chip includes two 50 G PCS channels, and each 50 G PCS channel sends M/2 pieces of data. Furthermore, two links corresponding to each 50 G PCS channel send M/4 pieces of data, and TDM coding is performed on the M/4 pieces of data sent by each link to form first data. The second data refers to M/4 pieces of data sent by each link.

At S102, the at least one piece of second data is transmitted to at least one first data transmission channel.

Figure 6:
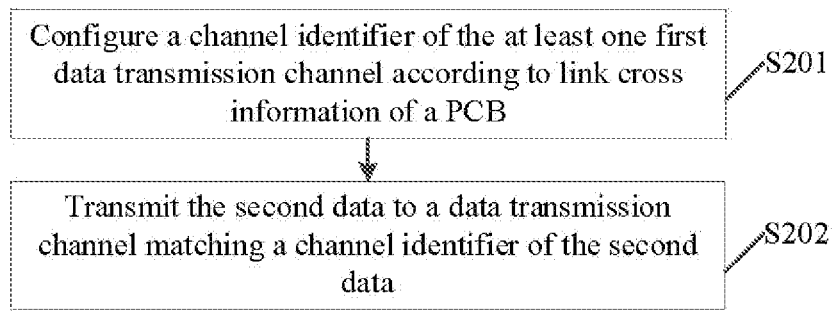
FIG. 6 is an alternative flowchart of a chip transmitting at least one piece of second data to at least one first data transmission channel according to an embodiment of the present disclosure.

In some embodiments, the operation that the chip transmits the at least one piece of second data to at least one first data transmission channel includes steps S201 to S202. FIG. 6 shows an alternative flowchart of the chip transmitting the at least one piece of second data to the at least one first data transmission channel according to an embodiment of the present disclosure, which will be described according to various steps.

At S201, a channel identifier of the at least one first data transmission channel is configured according to link cross information of a PCB.

In some embodiments, the link cross information of the PCB includes: a corresponding relationship between a data transmission link and a physical link port. As shown in FIG. 4, the link cross information of the PCB is that a PMAL0_TX of the Ethernet switching chip is connected to a PMDL2_TX physical link port of the QSFP28 optical module, a PMAL1_TX is connected to a PMDL0_TX physical link port of the QSFP28 optical module, a PMAL2_TX is connected to a PMDL1_TX physical link port of the QSFP28 optical module, and a PMAL3_TX is connected to a PMDL3_TX physical link port of the QSFP28 optical module.

In some embodiments, the operation that the chip configures a channel identifier of the at least one first data transmission channel according to the link cross information of the PCB includes: the chip configures a corresponding channel identifier for each first data transmission channel according to the link cross information.

In some embodiments, the first data transmission channel corresponds to at least one data transmission link, and the numbers of data transmission links corresponding to the first data transmission channels contained in the chip are equal.

For example, if the chip contains two first data transmission channels and the first data transmission channel corresponds to two data transmission links, the second data transmission channel corresponds to two data transmission links as well.

For example, the physical links of the Ethernet switching chip shown in FIG. 4 are enabled to correspond to the physical link ports of the QSFP28 one by one, ensuring that data of PCSL0_TX is sent to the PMDL0_TX physical link port, data of PCSL1_TX being sent to the PMDL1_TX physical link port, data of PCSL2_TX being sent to the PMDL2_TX physical link port, and data of PCSL3_TX being sent to the PMDL3_TX physical link port. It is to be guaranteed that the data of PCSL0_TX of the chip is sent to the PMAL1_TX, the data of PCSL1_TX of the chip being sent to the PMAL2_TX, the data of PCSL2_TX of the chip being sent to PMAL0_TX, and the data of PCSL3_TX of the chip being sent to PMAL3_TX.

That is to say, the PMAL1_TX and the PMAL2_TX receive the data sent by the 50 G PSC channel with the channel identifier being 0. The PMAL0_TX and the PMAL3_TX receive the data sent by the 50 G PSC channel with the channel identifier being 1. According to the link cross information of the PCB, the channel identifiers of the first first data transmission channel to the fourth first data transmission channel in the chip are configured to be 1, 0, 0 and 1 in sequence.

In other embodiments, the operation that the chip configures the channel identifier of the at least one first data transmission channel according to the link cross information of the PCB includes: in a case where the link cross information of the PCB is that an mth data transmission channel corresponds to an nth physical link port, a channel identifier of the mth data transmission channel is configured to match a port identifier of the nth physical link port so as to enable data of the mth data transmission channel to be transmitted to the nth physical link port. Herein, the m and n are both positive integers.

As shown in FIG. 4, an internal chip channel 50 G_0 PCS TX sends data to a Gearbox 0 TX and a Gearbox 1 TX respectively via a PCSL0 link and a PCSL1 link. A channel 50 G_1 PCS TX sends data to a Gearbox 2 TX and a Gearbox 3 TX respectively via the PCSL0 link and the PCSL1 link, the channel identifier of the channel 50 G_0 PCS TX being 0, the link identifier of the corresponding PCSL0 link being 0, and the link identifier of the corresponding PCSL1 link being 1. That is, the channel identifier carried by the second data sent by the PCSL0 link of the channel 50 G_0 PCS TX is 0, the link identifier being 0. The channel identifier carried by the second data sent by the PCSL1 link of the channel 50 G_0 PCS TX is 0, the link identifier being 1. The channel identifier of the channel 50 G_1 PCS TX is 1, the link identifier of the corresponding PCSL0 link is 0, and the link identifier of the corresponding PCSL1 link is 1. That is, the channel identifier carried by the second data sent by the PCSL0 link of the channel 50 G_1 PCS TX is 1, the link identifier being 0. The channel identifier carried by the second data sent by the PCSL1 link of the channel 50 G_1 PCS TX is 1, the link identifier being 1.

When there is no link cross of the PCB of the chip, the second data sent by the PCSL0 link of the channel 50 G_0 PCS TX carries channel identifier 0 and link identifier 0, and is sent to the Gearbox 0 TX inside the chip, sent to the PMAL0 TX via the Gearbox 0 TX, and then sent to the first physical link port PMDL 0 TX of the QSFP28 via the PMAL0 TX.

When the PCB of the chip has a link cross as shown in FIG. 4, the data of the PMAL0 will be sent to the third physical link port of the QSFP28, that is, PMDL2 TX, through the PCB.

The operation that the chip configures the link identifier of the at least one data transmission link according to the link cross information of the PCB includes: when there is no link cross on the PCB of the chip, the third physical link port PMDL2 TX of the QSFP28 receives data of the PMAL2, that is, data with a channel identifier being 1 and a link identifier being 0. In order to implement link anti-cross, channel identifier 1 and link identifier 0 are set for the physical link corresponding to the PMAL0, ensuring that the third physical link port PMDL2 TX of the QSFP28 receives data with a channel identifier being 1 and a link identifier being 0.

At S202, the second data is transmitted to a first data transmission channel matching a channel identifier of the second data.

In some embodiments, the operation that the chip transmits the second data to the first data transmission channel matching the channel identifier of the second data includes: when the channel identifier corresponding to the second data matches the channel identifier of the first data transmission channel, the chip transmits the second data to the first data transmission channel.

In some embodiments, the channel identifier corresponding to the second data matches the channel identifier of the first data transmission channel, which means that the channel identifier corresponding to the second data is equal to the channel identifier of the first data transmission channel.

For example, if the channel identifier corresponding to the second data is 1 and the channel identifier of the first data transmission channel is also 1, it is considered that the channel identifier corresponding to the second data matches the channel identifier of the first data transmission channel, and the chip transmits the second data with the channel identifier being 1 to the first data transmission channel with the channel identifier being 1. If the channel identifier corresponding to the second data is 1 and the channel identifier of the first data transmission channel is 0, it is considered that the channel identifier corresponding to the second data does not match the channel identifier of the first data transmission channel, and the chip does not transmit the second data with the channel identifier being 1 to the first data transmission channel with the channel identifier being 0.

In other embodiments, the chip transmits the second data to the first data transmission channel matching the channel identifier of the second data according to the channel identifier corresponding to the second data.

For example, according to the link cross information of the PCB as shown in FIG. 4, the channel identifiers of the first first data transmission channel to the fourth first data transmission channel in the chip are configured to be 1, 0, 0 and 1 in sequence. The chip transmits the second data with the channel identifier being 0 from the received first data to a second first data transmission channel and a third first data transmission channel. The chip transmits the second data with the channel identifier being 1 from the received first data to the first first data transmission channel and the fourth first data transmission channel.

In some embodiments, the sending end of the switching chip is provided with only one first data transmission channel, and the chip transmits all the first data to the first data transmission channel.

At S103, data of the at least one first data transmission channel is sent to at least one corresponding data transmission link according to link cross information of a PCB.

Figure 7:
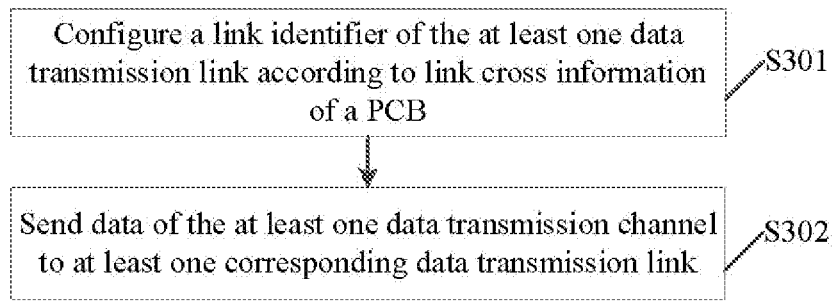
FIG. 7 is an alternative flowchart of a chip sending data of at least one first data transmission channel to at least one corresponding data transmission link according to an embodiment of the present disclosure.

In some embodiments, the operation that the chip sends the data of the at least one first data transmission channel to the at least one corresponding data transmission link according to link cross information of a PCB includes steps S301 to S302. FIG. 7 shows an alternative flowchart of the chip sending data of the at least one first data transmission channel to at least one corresponding data transmission link according to an embodiment of the present disclosure, which will be described according to various steps.

At S301, a link identifier of the at least one first data transmission link is configured according to link cross information of a PCB.

In some embodiments, the operation that the chip configures a link identifier of the at least one first data transmission link according to the link cross information of the PCB includes: the chip configures a corresponding link identifier for each data transmission link according to the link cross information.

In some embodiments, the link cross information of the PCB includes: a corresponding relationship between the data transmission link and a physical link port. As shown in FIG. 4, the link cross information of the PCB is that a PMAL0_TX of the Ethernet switching chip is connected to a PMDL2_TX physical link port of the QSFP28 optical module, a PMAL1_TX is connected to a PMDL0_TX physical link port of the QSFP28 optical module, a PMAL2_TX is connected to a PMDL1_TX physical link port of the QSFP28 optical module, and a PMAL3_TX is connected to a PMDL3_TX physical link port of the QSFP28 optical module.

For example, the links of the chip shown in FIG. 4 are enabled to correspond to the ports of a device panel one by one, ensuring that data of PCSL0_TX is sent to the PMDL0_TX physical link port, data of PCSL1_TX being sent to the PMDL1_TX physical link port, data of PCSL2_TX being sent to the PMDL2_TX physical link port, and data of PCSL3_TX being sent to the PMDL3_TX physical link port. It is to be guaranteed that the data of PCSL0_TX of the chip is sent to the PMAL1_TX, the data of PCSL1_TX of the chip being sent to the PMAL2_TX, the data of PCSL2_TX of the chip being sent to PMAL0_TX, and the data of PCSL3_TX of the chip being sent to PMAL3_TX.

That is to say, the PMAL0_TX receives the data sent by the data transmission link with the channel identifier being 1 and the link identifier being 0. The PMAL1_TX receives the data sent by the data transmission link with the channel identifier being 0 and the link identifier being 0. The PMAL2_TX receives the data sent by the data transmission link with the channel identifier being 0 and the link identifier being 1. The PMAL0_TX receives the data sent by the data transmission link with the channel identifier being 1 and the link identifier being 1. According to the link cross information of the PCB, the link identifiers of the first data transmission link to the fourth data transmission link in the chip are configured to be 0, 0, 1 and 1 in sequence.

In other embodiments, the operation that the chip configures the link identifier of the at least one data transmission link according to the link cross information of the PCB includes: in a case where the link cross information of the PCB is that an mth data transmission link corresponds to an nth physical link port, a link identifier of the mth data transmission link is configured to match a port identifier of the nth physical link port so as to enable data of the mth data transmission link to be transmitted to the nth physical link port. Herein, the m and n are both positive integers.

As shown in FIG. 4, an internal chip channel 50 G_0 PCS TX sends data to a Gearbox 0 TX and a Gearbox 1 TX respectively via a PCSL0 link and a PCSL1 link. A channel 50 G_1 PCS TX sends data to a Gearbox 2 TX and a Gearbox 3 TX respectively via the PCSL0 link and the PCSL1 link, the channel identifier of the channel 50 G_0 PCS TX being 0, the link identifier of the corresponding PCSL0 link being 0, and the link identifier of the corresponding PCSL1 link being 1. That is, the channel identifier carried by the second data sent by the PCSL0 link of the channel 50 G_0 PCS TX is 0, the link identifier being 0. The channel identifier carried by the second data sent by the PCSL1 link of the channel 50 G_0 PCS TX is 0, the link identifier being 1. The channel identifier of the channel 50 G_1 PCS TX is 1, the link identifier of the corresponding PCSL0 link is 0, and the link identifier of the corresponding PCSL1 link is 1. That is, the channel identifier carried by the second data sent by the PCSL0 link of the channel 50 G_1 PCS TX is 1, the link identifier being 0. The channel identifier carried by the second data sent by the PCSL1 link of the channel 50 G_1 PCS TX is 1, the link identifier being 1.

When there is no link cross of the PCB of the chip, the second data sent by the PCSL0 link of the channel 50 G_0 PCS TX carries channel identifier 0 and link identifier 0, and is sent to the Gearbox 0 TX inside the chip, sent to the PMAL0 TX via the Gearbox 0 TX, and then sent to the first physical link port PMDL0_TX of the QSFP28 via the PMAL0 TX.

When the PCB of the chip has a link cross as shown in FIG. 4, the data of the PMAL0 will be sent to the third physical link port of the QSFP28, that is, PMDL2 TX, through the PCB.

The operation that the chip configures the link identifier of the at least one data transmission link according to the link cross information of the PCB includes: when there is no link cross on the PCB of the chip, the third physical link port PMDL2 TX of the QSFP28 receives data of the PMAL2, that is, data with a channel identifier being 1 and a link identifier being 0. In order to implement link anti-cross, channel identifier 1 and link identifier 0 are set for the physical link corresponding to the PMAL0, ensuring that the third physical link port PMDL2 TX of the QSFP28 receives data with a channel identifier being 1 and a link identifier being 0.

At S302, data of the at least one first data transmission channel is sent to at least one corresponding data transmission link.

In some embodiments, the operation that the chip sends the data of the at least one first data transmission channel to the at least one corresponding data transmission link includes: the chip sends the data of the first data transmission channel to a data transmission link the same as the link identifier of the data.

In other embodiments, the chip sends the second data to the first data transmission channel matching the link identifier of the second data according to the link identifier corresponding to the second data. The second data includes at least one piece of fourth data, and the channel identifiers of the fourth data are the same, but the link identifiers are different. The chip sends the fourth data to the data transmission link matching the link identifier of the fourth data according to the link identifier of the fourth data.

For example, the first data transmission channel corresponds to two data transmission links, and among N pieces of data received by the first data transmission channel, the first to (N/2)th pieces of data are data with the link identifier being 0, and the (N/2+1)th to (N)th pieces of data are data with the link identifier being 1. According to the link identifiers of the N pieces of data, the chip sends the first to (N/2)th pieces of data to the data transmission link with the link identifier being 0, and sends the (N/2+1)th to (N)th pieces of data to the data transmission link with the link identifier being 1.

Or, the first data transmission channel corresponds to two data transmission links, and among N pieces of data received by the first data transmission channel, the data with an odd sequence number is data with the link identifier being 0, and the data with an even sequence number is data with the link identifier being 1. According to the link identifiers of the N pieces of data, the chip sends the data with the odd sequence number to the data transmission link with the link identifier being 0, and sends the data with the even sequence number to the data transmission link with the link identifier being 1.

Thus, according to the sending-end data processing method described in the above-mentioned embodiment, the chip may configure the channel identifier of the first data transmission channel according to the link cross information of the PCB, and/or the chip may configure the link identifier of the data transmission link according to the link cross information of the PCB. When a chip is provided with a plurality of first data transmission channels, and each first data transmission channel corresponds to a plurality of data transmission links, the chip sends data according to a channel identifier and a link identifier, so that the effect of PCB link anti-cross is implemented when sending data. The embodiment of the present disclosure does not use logical links, and thus does not introduce redundant clocks, and further does not increase the burden of chip back-end clock tree selection. Meanwhile, as a sending channel and a sending link increase, the embodiment of the present disclosure may configure the channel identifier of the first data transmission channel inside the chip and/or the link identifier of the data transmission link inside the chip according to actual situations so as to implement PCB link anti-cross of multi-channel and multi-link scenarios, with strong scalability.

Figure 8:
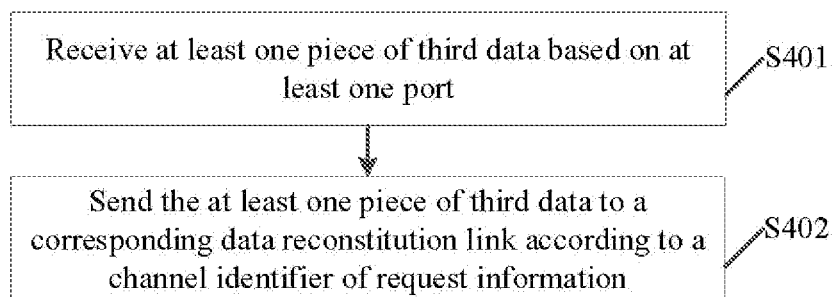
FIG. 8 is an alternative flowchart for receiving data by a chip in a data processing method according to an embodiment of the present disclosure.

FIG. 8 shows an alternative flowchart of a sending end in a data processing method according to the present disclosure, which will be described according to various steps.

At S401, at least one piece of third data is received based on at least one port.

In some embodiments, the chip receives at least one piece of third data based on at least one port. Further, each data transmission channel of the chip receives one piece of third data.

In some embodiments, the third data carries the channel identifier of a channel on which the third data is sent and/or the third data carries the link identifier of a link on which the sending end sends the third data. The third data is data sent out by the data transmission link of the chip.

At S402, the at least one piece of third data is sent to a corresponding data reconstitution link according to a channel identifier and a link identifier of the third data.

Figure 9:
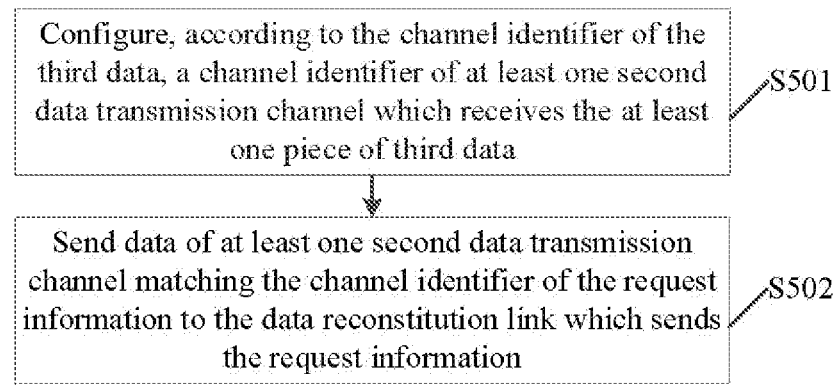
FIG. 9 is an alternative flowchart of a chip for transmitting at least one piece of third data to at least one second data transmission channel according to an embodiment of the present disclosure.

In some embodiments, the operation that the chip sends the at least one piece of third data to a corresponding data reconstitution link according to a channel identifier and a link identifier of the third data includes steps S501 to S502. FIG. 9 shows an alternative flowchart of a chip for sending the at least one piece of third data to the corresponding data reconstitution link according to the channel identifier and the link identifier of the third data, including steps S501 to S502, and description will be made according to various steps.

At S501, a channel identifier of at least one second data transmission channel which receives the at least one piece of third data is configured according to the channel identifier of the third data.

In some embodiments, the third data carries the channel identifier and link identifier that transmit the third data. The operation of configuring, according to the channel identifier of the third data, the channel identifier of the at least one second data transmission channel which receives the at least one piece of third data includes: the channel identifier of the second data transmission channel is configured to be a channel identifier of the third data received by the second data transmission channel.

For example, the links of the chip shown in FIG. 4 are enabled to correspond to the ports of a device panel one by one, ensuring that data of a PMDL0_RX physical link port is sent to the PCSL0_RX, data of a PMDL1_RX physical link port being sent to the PCSL1_RX, data of a PMDL2_RX physical link port being sent to the PCSL2_RX, and data of a PMDL3_RX physical link port being sent to the PCSL3_RX. It is to be ensured that the data of the PMAL1_RX of the device panel is sent to the PCSL0_RX of the chip, the data of the PMAL2_RX of the device panel being sent to the PCSL1_RX of the chip, the data of the PMAL 0_RX of the device panel being sent to the PCSL 2_RX of the chip, and the data of the PMAL3_RX of the device panel being sent to the PCSL3_RX of the chip.

That is to say, the PMAL1_RX and the PMAL2_RX receive the data with the channel identifier being 0. The PMAL0_RX and the PMAL3_RX receive the data with the channel identifier being 1.

According to a channel standard of the received data, the channel identifiers of the first second data transmission channel to the fourth second data transmission channel in the chip are configured to be 1, 0, 0 and 1 in sequence.

At S502, according to the channel identifier carried in request information sent by the data reconstitution link, data of at least one second data transmission channel matching the channel identifier of the request information is sent to the data reconstitution link which sends the request information.

In some embodiments, the request information is third data sent by the data reconstitution link for requesting a match to the channel identifier of the request information.

In some embodiments, the chip receives the request information and sends, according to the channel identifier of the request information, the data of at least one second data transmission channel matching the channel identifier of the request information to the data reconstitution link which sends the request information.

In some embodiments, matching the channel identifier refers to that the channel identifier of the request information is equal to the channel identifier of the second data transmission channel.

For example, the channel identifier of the request information received by the chip is 0, and the channel identifiers of the first to fourth second data transmission channels contained in the chip are 1, 0, 0 and 1 in sequence. According to the channel identifier of the request information, the chip sends the data of a second transmission channel with the channel identifier being 0 to the data reconstitution link which sends the request information. With regard to the data of the second transmission channel with the channel identifier being 1, the chip does not perform any processing temporarily. When the channel identifier of the request information received by the chip is 1, the chip sends the data of the second transmission channel with the channel identifier being 1 to the data reconstitution link which sends the request information according to the channel identifier of the request information.

In some embodiments, the data reconstitution link is used to reconstitute the third data with consistent channel identifiers.

For example, for the PCB link cross as shown in FIG. 4, the data reconstitution link sends the request information to the chip, the channel identifier of the request information being 0, and the chip sending the received data with the channel identifier being 0 to the data reconstitution link. That is, the chip sends the data in the second second data transmission channel and the third second data transmission channel to the data reconstitution link. When the third data is M/4 pieces of data, the data reconstitution link receives M/2 pieces of data with the channel identifier being 0, and reconstitutes the M/2 pieces of data with the channel identifier being 0.

In some embodiments, the data reconstitution link reconstitutes the third data according to the link identifier of the data.

In other embodiments, after receiving the M/2 pieces of data with the channel identifier being 0, the data reconstitution link sorts the M/2 pieces of data according to a link sequence and reconstitutes same into M/2 pieces of data.

For example, the data reconstitution link receives the M/2 pieces of data with the channel identifier being 0, the M/2 pieces of data include M/4 pieces of data with the link identifier being 0 and M/4 pieces of data with the link identifier being 1, and the M/2 pieces of data are sorted according to the link identifiers and reconstituted into M/2 pieces of data.

In some embodiments, the method further includes: TDM decoding is performed on the data reconstituted out by the data reconstitution link according to the channel identifier.

In some embodiments, the method further includes: when the number of second data transmission channels corresponding to the same channel identifier of the chip is greater than a maximum value of the link identifier carried by the currently received third data, the chip sends the data matching all the channel identifiers in the third data to the data reconstitution link according to the channel identifier of the request information. When the chip receives the request information of the channel identifier again, the chip sends the data reconstitution link the data of which the link number is greater than the maximum value of the link identifier carried by the third data last time among the data matching all the channel identifiers in the third data.

For example, in a chip, the number of second data transmission channels with the channel identifier being 0 is Y, and among the data with the channel identifier being 0 carried by the third data currently received by the chip, the maximum value of the link identifier is X, and the Y is greater than X. The data reconstitution link sends the request information to the chip to request data with the channel identifier being 0, and the chip sends the X pieces of data to the data reconstitution link. When the data reconstitution link once again sends the request information to the chip to request the data with the channel identifier being 0, the chip sends data with the link identifier being greater than X to the data reconstitution link until the data reconstitution link receives data with the link identifier being Y.

Thus, when the link identifier of the data received by the chip is less than the number of corresponding second data transmission channels of the chip, the chip may still send all the data of the corresponding channel identifier to the data reconstitution link according to the multiple request information, so that the data reconstitution link can perform reconstitution on the data.

Thus, according to the receiving-end data processing method described in the above-mentioned embodiment, the chip may configure the channel identifier of the second data transmission channel according to the link cross information of the PCB. The chip achieves the effect of PCB link anti-cross by receiving data according to the channel identifier. The embodiment of the present disclosure does not use logical links, and thus does not introduce redundant clocks, and further does not increase the burden of chip back-end clock tree selection. Meanwhile, as a sending channel and a sending link increase, the embodiment of the present disclosure may configure the channel identifier of the second data transmission channel inside the chip according to actual situations so as to implement PCB link anti-cross of multi-channel and multi-link scenarios, with strong scalability.

Figure 10:
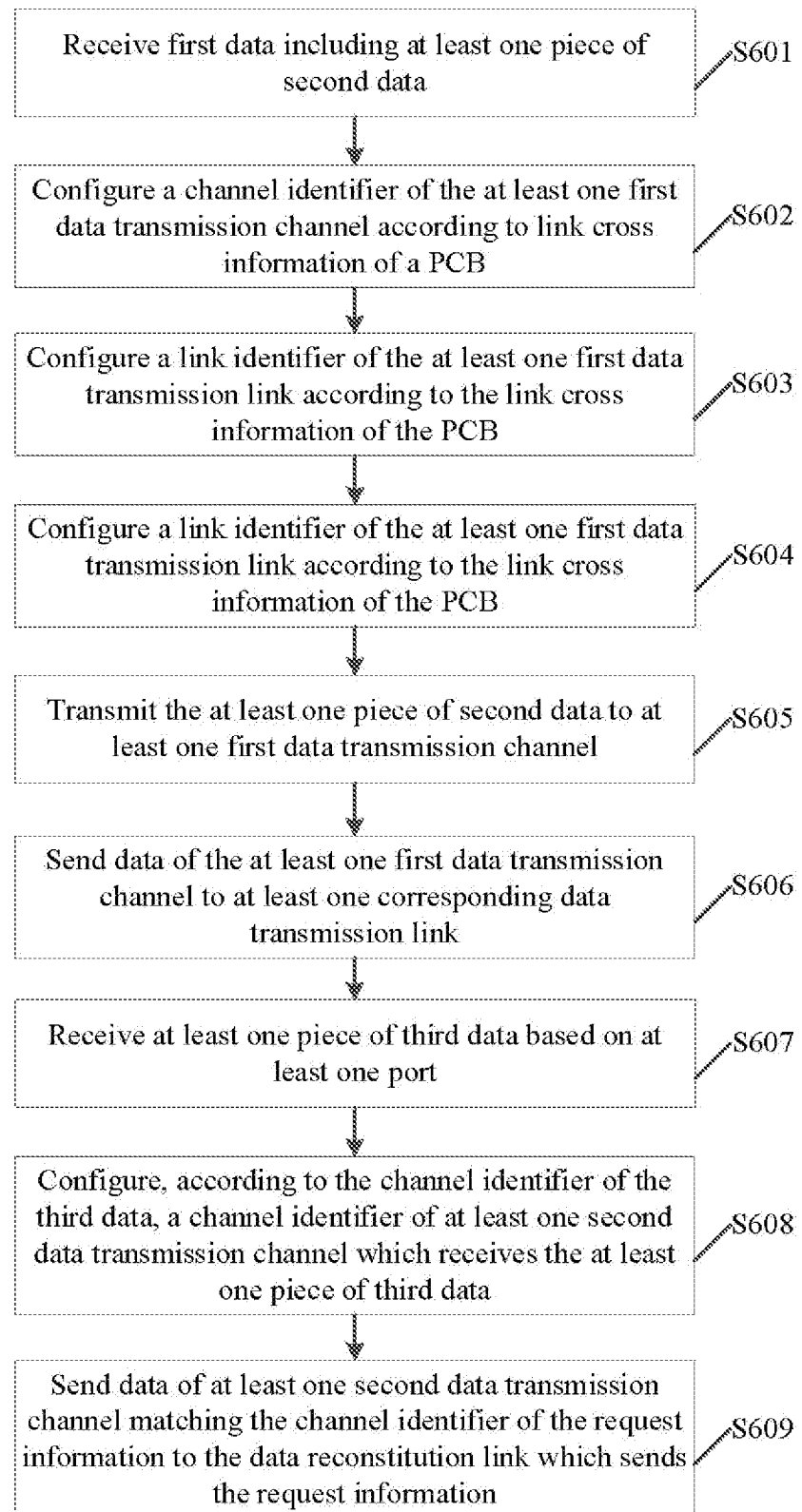
FIG. 10 is an alternative flowchart of a data processing method according to an embodiment of the present disclosure.

FIG. 10 shows an alternative flowchart of a data processing method according to the present disclosure, which will be described according to various steps.

At S601, first data including at least one piece of second data is received.

In some embodiments, a chip receives the first data including the at least one piece of second data. The second data is data sent by a link contained in an internal chip channel, and the first data is a set of all the second data.

In other embodiments, each first data transmission channel of the chip receives the first data including the at least one piece of second data, the first data transmission channel being a channel for transmitting data in the chip, the first data transmission channel corresponding to at least one data transmission link, and the number of the data transmission links being the total number of links contained in all internal chip channels that transmit the first data.

In some embodiments, the numbers of data transmission links corresponding to the first data transmission channels contained in the chip are equal.

For example, if there are two first data transmission channels in the chip and the first first data transmission channel corresponds to two data transmission links, the second first data transmission channel corresponds to two data transmission links as well.

In some embodiments, the first data is total data sent by all channels of the chip. The first data is sent to all first data transmission channels of the chip in a broadcasting manner.

In some embodiments, the first data further includes: channel information corresponding to a channel that sends each piece of the first data. The channel information may be a channel identifier. The second data carries a channel identifier of a channel that sends the second data.

In other embodiments, the first data further includes: link information corresponding to a link that sends each piece of the first data. The link information may be a link identifier. The second data carries a link identifier of a link that sends the second data.

At S602, a channel identifier of the at least one first data transmission channel is configured according to link cross information of a PCB.

In some embodiments, the link cross information of the PCB includes: a corresponding relationship between a data transmission link and a physical link port.

In some embodiments, the operation that the chip configures a channel identifier of the at least one first data transmission channel according to the link cross information of the PCB includes: the chip configures a corresponding channel identifier for each first data transmission channel according to the link cross information.

In some embodiments, the first data transmission channel corresponds to at least one data transmission link, and in the chip, the data transmission links corresponding to each first data transmission channel are equal.

In other embodiments, the operation that the chip configures the channel identifier of the at least one first data transmission channel according to the link cross information of the PCB includes: when an nth data transmission link corresponds to an nth physical link port, a link identifier of the mth data transmission link is configured as a link identifier of the nth data transmission link. Herein, the m and n are both positive integers.

As shown in FIG. 4, the physical link port corresponding to a first first data transmission channel of the sending end is PMDL2_TX. When there is no PCB link cross, the channel identifier of the first data transmission channel corresponding to the PMDL2_TX physical link port is 1, and therefore the channel identifier of the first first data transmission channel is configured to be 1.

In some embodiments, the PCB link cross includes: the data transmission links of the chip are not in one-to-one correspondence with the physical link ports of other modules than the chip. As shown in FIG. 4, a PMAL0_TX of the Ethernet switching chip is connected to a PMDL2_TX physical link port of the QSFP28 optical module, a PMAL1_TX being connected to a PMDL0_TX physical link port of the QSFP28 optical module, a PMAL2_TX being connected to a PMDL1_TX physical link port of the QSFP28 optical module, and a PMAL3_TX being connected to a PMDL3_TX physical link port of the QSFP28 optical module. The data transmission links of the Ethernet switching chip are not in one-to-one correspondence with furnace link ports of the QSFP optical module, and it is considered that there is a PCB link cross.

At S603, the second data is transmitted to a first data transmission channel matching a channel identifier of the second data.

In some embodiments, the operation that the chip transmits the second data to the first data transmission channel matching the channel identifier of the second data includes: when the channel identifier corresponding to the second data matches the channel identifier of the first data transmission channel, the chip transmits the second data to the first data transmission channel.

In other embodiments, the chip transmits the second data to the first data transmission channel matching the channel identifier of the second data according to the channel identifier corresponding to the second data.

For example, according to the link cross information of the PCB as shown in FIG. 4, the channel identifiers of the first first data transmission channel to the fourth first data transmission channel in the chip are configured to be 1, 0, 0 and 1 in sequence. The chip transmits the second data with the channel identifier being 0 from the received first data to a second first data transmission channel and a third first data transmission channel. The chip transmits the second data with the channel identifier being 1 from the received first data to the first first data transmission channel and the fourth first data transmission channel.

In some embodiments, the sending end of the switching chip is provided with only one first data transmission channel, and the chip transmits all the first data to the first data transmission channel.

At S604, a link identifier of the at least one first data transmission link is configured according to link cross information of a PCB.

In some embodiments, the operation that the chip configures a link identifier of the at least one first data transmission link according to the link cross information of the PCB includes: the chip configures a corresponding link identifier for each data transmission link according to the link cross information.

In some embodiments, the link cross information of the PCB includes: a corresponding relationship between a data transmission link and a physical link port.

In other embodiments, the operation that the chip configures the link identifier of the at least one data transmission link according to the link cross information of the PCB includes: in a case where the link cross information of the PCB is that an mth data transmission link corresponds to an nth physical link port, a link identifier of the mth data transmission link is configured to match a port identifier of the nth physical link port so as to enable data of the mth data transmission link to be transmitted to the nth physical link port. Herein, the m and n are both positive integers.

As shown in FIG. 4, an internal chip channel 50 G_0 PCS TX sends data to a Gearbox 0 TX and a Gearbox 1 TX respectively via a PCSL0 link and a PCSL1 link. A channel 50 G_1 PCS TX sends data to a Gearbox 2 TX and a Gearbox 3 TX respectively via the PCSL0 link and the PCSL1 link, the channel identifier of the channel 50 G_0 PCS TX being 0, the link identifier of the corresponding PCSL0 link being 0, and the link identifier of the corresponding PCSL1 link being 1.

That is, the channel identifier carried by the second data sent by the PCSL0 link of the channel 50 G_0 PCS TX is 0, the link identifier being 0. The channel identifier carried by the second data sent by the PCSL1 link of the channel 50 G_0 PCS TX is 0, the link identifier being 1. The channel identifier of the channel 50 G_1 PCS TX is 1, the link identifier of the corresponding PCSL0 link is 0, and the link identifier of the corresponding PCSL1 link is 1. That is, the channel identifier carried by the second data sent by the PCSL0 link of the channel 50 G_1 PCS TX is 1, the link identifier being 0. The channel identifier carried by the second data sent by the PCSL1 link of the channel 50 G_1 PCS TX is 1, the link identifier being 1.

When there is no link cross of the PCB of the chip, the second data sent by the PCSL0 link of the channel 50 G_0 PCS TX carries channel identifier 0 and link identifier 0, and is sent to the Gearbox 0 TX inside the chip, sent to the PMAL0 TX via the Gearbox 0 TX, and then sent to the first physical link port PMDL 0 TX of the QSFP28 via the PMAL0 TX.

When the PCB of the chip has a link cross as shown in FIG. 4, the data of the PMAL0 will be sent to the third physical link port of the QSFP28, that is, PMDL2 TX, through the PCB.

The operation that the chip configures the link identifier of the at least one data transmission link according to the link cross information of the PCB includes: when there is no link cross on the PCB of the chip, the third physical link port PMDL2 TX of the QSFP28 receives data of the PMAL2, that is, data with a channel identifier being 1 and a link identifier being 0. In order to implement link anti-cross, channel identifier 1 and link identifier 0 are set for the physical link corresponding to the PMAL0, ensuring that the third physical link port PMDL2 TX of the QSFP28 receives data with a channel identifier being 1 and a link identifier being 0.

At S605, the at least one piece of second data is transmitted to at least one first data transmission channel.

In some embodiments, the operation that the chip transmits the second data to the first data transmission channel matching the channel identifier of the second data includes: when the channel identifier corresponding to the second data matches the channel identifier of the first data transmission channel, the chip transmits the second data to the first data transmission channel.

In other embodiments, the chip transmits the second data to the first data transmission channel matching the channel identifier of the second data according to the channel identifier corresponding to the second data.

In some embodiments, there is only one first data transmission channel in the switching chip, and the chip transmits all the first data to the first data transmission channel.

At S606, data of the at least one first data transmission channel is sent to at least one corresponding data transmission link.

In some embodiments, the operation that the chip sends the data of the at least one first data transmission channel to the at least one corresponding data transmission link includes: the chip sends the data of the first data transmission channel to a data transmission link the same as the link identifier of the data.

In other embodiments, the chip sends the second data to the first data transmission channel matching the link identifier of the second data according to the link identifier corresponding to the second data. The second data includes at least one piece of fourth data, and the channel identifiers of the fourth data are the same, but the link identifiers are different. The chip sends the fourth data to the data transmission link matching the link identifier of the fourth data according to the link identifier of the fourth data.

At S607, at least one piece of third data is received based on at least one port.

In some embodiments, the chip receives at least one piece of third data based on at least one port. Further, each data transmission channel of the chip receives one piece of third data.

In some embodiments, the third data carries the channel identifier of a channel on which the third data is sent and/or the third data carries the link identifier of a link on which the sending end sends the third data. The third data is data sent out by the data transmission link of the chip.

At S608, a channel identifier of at least one second data transmission channel which receives the at least one piece of third data is configured according to the channel identifier of the third data.

In some embodiments, the third data carries the channel identifier and link identifier that transmit the third data. The operation of configuring, according to the channel identifier of the third data, the channel identifier of the at least one second data transmission channel which receives the at least one piece of third data includes: the channel identifier of the second data transmission channel is configured to be a channel identifier of the third data received by the second data transmission channel.

For example, the links of the chip shown in FIG. 4 are enabled to correspond to the ports of a device panel one by one, ensuring that data of a PMDL0_RX physical link port is sent to the PCSL0_RX, data of a PMDL1_RX physical link port being sent to the PCSL1_RX, data of a PMDL2_RX physical link port being sent to the PCSL2_RX, and data of a PMDL3_RX physical link port being sent to the PCSL3_RX. It is to be ensured that the data of the PMAL1_RX of the device panel is sent to the PCSL0_RX of the chip, the data of the PMAL2_RX of the device panel being sent to the PCSL1_RX of the chip, the data of the PMAL 0_RX of the device panel being sent to the PCSL 2_RX of the chip, and the data of the PMAL3_RX of the device panel being sent to the PCSL3_RX of the chip.

That is to say, the PMAL1_RX and the PMAL2_RX receive the data with the channel identifier being 0. The PMAL0_RX and the PMAL3_RX receive the data with the channel identifier being 1.

According to a channel standard of the received data, the channel identifiers of the first second data transmission channel to the fourth second data transmission channel in the chip are configured to be 1, 0, 0 and 1 in sequence.

At S609, according to the channel identifier carried in request information sent by the data reconstitution link, data of at least one second data transmission channel matching the channel identifier of the request information is sent to the data reconstitution link which sends the request information.

In some embodiments, the request information is third data sent by the data reconstitution link for requesting a match to the channel identifier of the request information.

In some embodiments, the chip receives the request information and sends, according to the channel identifier of the request information, the data of at least one second data transmission channel matching the channel identifier of the request information to the data reconstitution link which sends the request information.

In some embodiments, matching the channel identifier refers to that the channel identifier of the request information is equal to the channel identifier of the second data transmission channel.

For example, the channel identifier of the request information received by the chip is 0, and the channel identifiers of the first to fourth second data transmission channels contained in the chip are 1, 0, 0 and 1 in sequence. According to the channel identifier of the request information, the chip sends the data of a second transmission channel with the channel identifier being 0 to the data reconstitution link which sends the request information. With regard to the data of the second transmission channel with the channel identifier being 1, the chip does not perform any processing temporarily. When the channel identifier of the request information received by the chip is 1, the chip sends the data of the second transmission channel with the channel identifier being 1 to the data reconstitution link which sends the request information according to the channel identifier of the request information.

In some embodiments, the data reconstitution link is used to reconstitute the third data with consistent channel identifiers.

For example, for the PCB link cross as shown in FIG. 4, the data reconstitution link sends the request information to the chip, the channel identifier of the request information being 0, and the chip sending the received data with the channel identifier being 0 to the data reconstitution link. That is, the chip sends the data in the second second data transmission channel and the third second data transmission channel to the data reconstitution link. When the third data is M/4 pieces of data, the data reconstitution link receives M/2 pieces of data with the channel identifier being 0, and reconstitutes the M/2 pieces of data with the channel identifier being 0.

In some embodiments, the data reconstitution link reconstitutes the third data according to the link identifier of the data.

In other embodiments, after receiving the M/2 pieces of data with the channel identifier being 0, the data reconstitution link sorts the M/2 pieces of data according to a link sequence and reconstitutes same into M/2 pieces of data.

For example, the data reconstitution link receives the M/2 pieces of data with the channel identifier being 0, the M/2 pieces of data include M/4 pieces of data with the link identifier being 0 and M/4 pieces of data with the link identifier being 1, and the M/2 pieces of data are sorted according to the link identifiers and reconstituted into M/2 pieces of data.

In some embodiments, the method further includes: TDM decoding is performed on the data reconstituted out by the data reconstitution link according to the channel identifier.

In some embodiments, the method further includes: when the number of second data transmission channels corresponding to the same channel identifier of the chip is greater than a maximum value of the link identifier carried by the currently received third data, the chip sends the data matching all the channel identifiers in the third data to the data reconstitution link according to the channel identifier of the request information. When the chip receives the request information of the channel identifier again, the chip sends the data reconstitution link the data of which the link number is greater than the maximum value of the link identifier carried by the third data last time among the data matching all the channel identifiers in the third data.

Thus, according to the data processing method described in the above-mentioned embodiment, the chip may configure the channel identifiers of the first data transmission channel and the second data transmission channel according to the link cross information of the PCB, and/or the chip may configure the link identifier of the data transmission link according to the link cross information of the PCB. When a chip is provided with a plurality of first data transmission channels and each first data transmission channel corresponds to a plurality of data transmission links, the chip sends data according to a channel identifier and a link identifier, so that the effect of PCB link anti-cross is implemented when sending data. The chip achieves the effect of PCB link anti-cross when receiving data by receiving data according to the channel identifier. The embodiment of the present disclosure does not use logical links, and thus does not introduce redundant clocks, and further does not increase the burden of chip back-end clock tree selection. Meanwhile, as the numbers of the channel identifiers and link identifiers that receive data increase, the embodiment of the present disclosure may configure the channel identifier of the first data transmission channel and the channel identifier of the second data transmission channel according to actual situations, and/or the link identifier of the data transmission link inside the chip so as to implement PCB link anti-cross of multi-channel and multi-link scenarios, with strong scalability.

Figure 11:
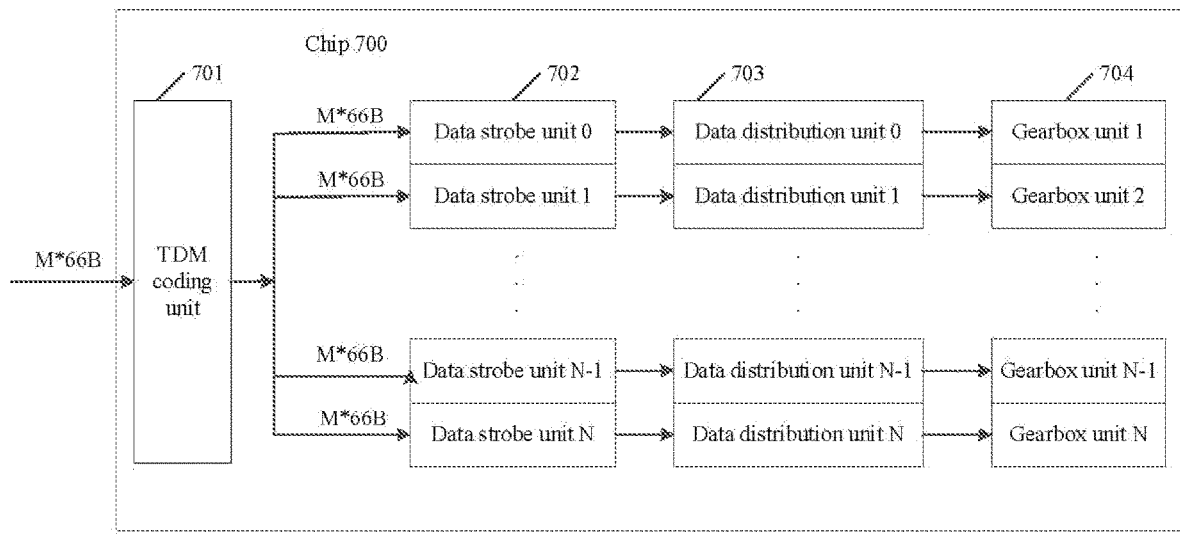
FIG. 11 is an alternative structural schematic diagram I of a chip sending apparatus of a data processing apparatus according to an embodiment of the present disclosure.

FIG. 11 shows an alternative structural schematic diagram I of a sending end of a data processing apparatus according to the present disclosure, which will be described according to various units.

A chip 700 is adapted to configure, according to link cross information of a PCB, a channel identifier of the at least one first data transmission channel, and/or configure, according to the link cross information of the PCB, a link identifier of the at least one data transmission link.

In some embodiments, the operation that the chip 700 configures the link identifier of the at least one data transmission link according to the link cross information of the PCB includes: in a case where the link cross information of the PCB is that an mth data transmission link corresponds to an nth physical link port, a link identifier of the mth data transmission link is configured to match a port identifier of the nth physical link port so as to enable data of the mth data transmission link to be transmitted to the nth physical link port. Herein, the m and n are both positive integers.

A TDM coding unit 701 is adapted to perform TDM coding on the data sent out by all links in all channels of the chip, and send same to all data strobe units 702 of the chip 700 in a broadcasting manner.

The data strobe unit 702 is adapted to receive first data including at least one piece of second data obtained after TDM coding on the data sent out by all links in all channels of the chip, and transmit the at least one piece of second data to at least one first data transmission channel.

In some embodiments, the data strobe unit 702 transmits the second data to a first data transmission channel matching a channel identifier of the second data.

A data distribution unit 703 is adapted to send data of the at least one first data transmission channel to at least one corresponding data transmission link according to the link cross information of the PCB.

In some embodiments, the data distribution unit sends the second data to a data transmission link matching a link identifier of the second data.

A gearbox unit 704 is adapted to change the rate of the data sent out by the data distribution unit 703.

Figure 12:
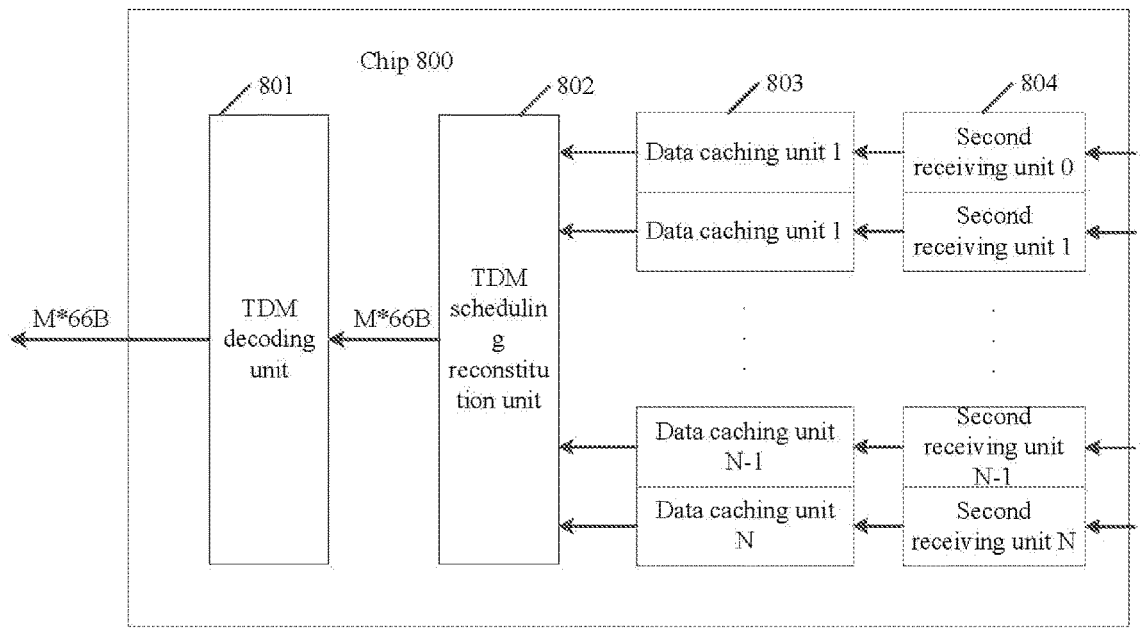
FIG. 12 is an alternative structural schematic diagram I of a chip receiving apparatus of a data processing apparatus according to an embodiment of the present disclosure.

FIG. 12 shows an alternative structural schematic diagram I of a receiving end of a data processing apparatus according to the present disclosure, which will be described according to various units.

A chip 800 is adapted to configure, according to the channel identifier of the third data, a channel identifier of at least one second data transmission channel which receives the at least one piece of third data.

A second receiving unit 804 is adapted to respectively receive at least one piece of third data based on at least one port.

A data caching unit 803 is adapted to send at least one piece of third data to a corresponding data reconstitution link according to a channel identifier and a link identifier of the third data.

A TDM scheduling reconstitution unit 802 is adapted to send request information to the data caching unit, the request information carrying a channel identifier.

In some embodiments, the TDM scheduling reconstitution unit 802 sends the request information to the data caching unit in a channel identifier sequence.

In some embodiments, the data caching unit 803 is further adapted to send the data of at least one second data transmission channel matching the channel identifier of the request information to the TDM scheduling reconstitution unit 802 which sends out the request information.

In some embodiments, the TDM scheduling reconstitution unit 802 is further adapted to reconstitute the third data according to the link identifier of the data.

A TDM decoding unit 801 is adapted to perform TDM decoding on the third data reconstituted by the TDM scheduling reconstitution unit 802.

Figure 13:
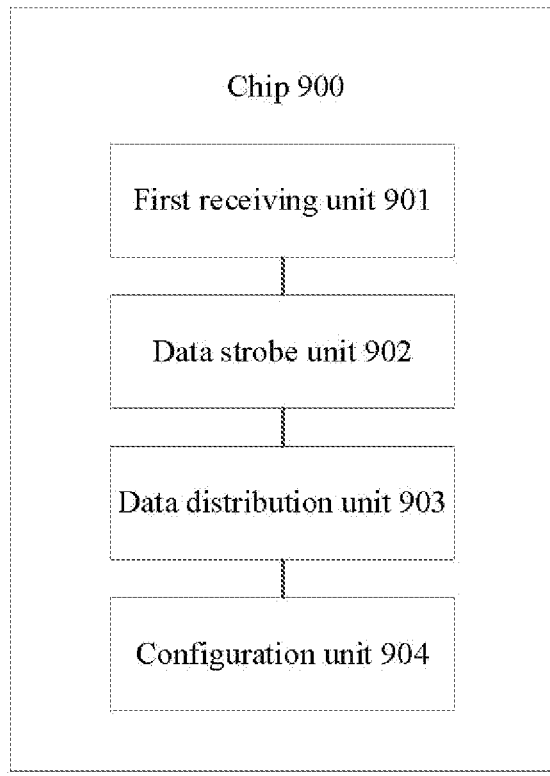
FIG. 13 is an alternative structural schematic diagram II of a chip sending apparatus of a data processing apparatus according to an embodiment of the present disclosure.

FIG. 13 shows an alternative structural schematic diagram II of a sending end of a data processing apparatus according to the present disclosure, which will be described according to various units.

A first receiving unit 901 is adapted to receive first data including at least one piece of second data.

A data strobe unit 902 is adapted to transmit the at least one piece of second data to at least one first data transmission channel.

A data distribution unit 903 is adapted to send data of the at least one first data transmission channel to at least one corresponding data transmission link according to the link cross information of the PCB.

A configuration unit 904 is adapted to configure a channel identifier of the at least one first data transmission channel according to the link cross information of the PCB.

The data strobe unit 902 is further adapted to transmit the second data to a first data transmission channel matching a channel identifier of the second data.

The configuration unit 904 is further adapted to configure a link identifier of the at least one data transmission link according to the link cross information of the PCB. It is included that when an mth data transmission link corresponds to an nth physical link port, a link identifier of the nth data transmission link is configured as a link identifier of the nth data transmission link. Herein, the m and n are both positive integers.

The data distribution unit 903 is further adapted to send the second data to a data transmission link matching a link identifier of the second data.

Figure 14:
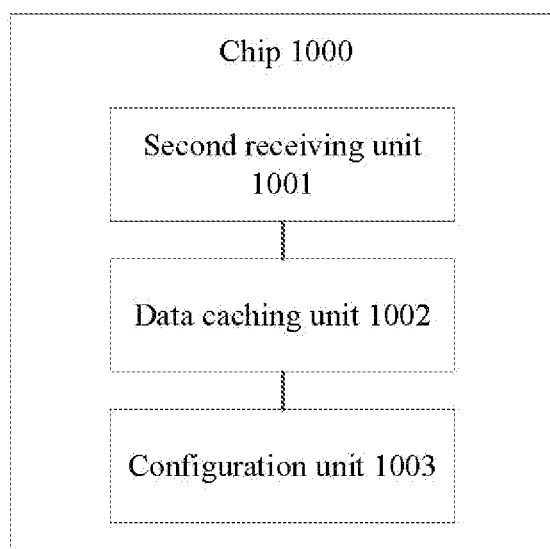
FIG. 14 is an alternative structural schematic diagram II of a chip receiving apparatus of a data processing apparatus according to an embodiment of the present disclosure.

FIG. 14 shows an alternative structural schematic diagram II of a receiving end of a data processing apparatus according to the present disclosure, which will be described according to various units.

A second receiving unit 1001 is adapted to respectively receive at least one piece of third data based on at least one port.

A data caching unit 1002 is adapted to send at least one piece of third data to a corresponding data reconstitution link according to a channel identifier of the request information.

A configuration unit 1003 is adapted to configure, according to the channel identifier of the third data, a channel identifier of at least one data caching unit which receives the at least one piece of third data.

The data caching unit 1002 is further adapted to send the data of at least one data caching unit matching the channel identifier of the request information to the data reconstitution link of the request information.

It is to be understood by those of ordinary skill in the art that all or some of the steps for implementing the above-mentioned method embodiments can be completed by hardware related to program commands; the above-mentioned program may be stored in a storage medium; and when the program is executed, when receiving a notification message based on a second application in the running process of a first application, a first area on a screen of an electronic device responds to the notification message. Herein, the first area is smaller than a corresponding area on the screen of the electronic device where an input method loaded when running the second application alone is applied. The above-mentioned storage medium includes: various media capable of storing program codes such as a removable storage device, a Read-Only Memory (ROM), a Random Access Memory (RAM), a magnetic disk, or an optical disk.

Or, the integrated unit of the present disclosure may also be stored in a computer readable storage medium if being implemented in the form of a software functional module and sold or used as a standalone product. Based on such an understanding, the technical solutions of the embodiments of the present disclosure substantially or parts making contributions to the conventional art may be embodied in form of software product, and the computer software product is stored in a storage medium, including a plurality of commands configured to enable a computer device (which may be a personal computer, a server, a network device or the like) to execute all or part of the steps of the method in each embodiment of the present disclosure. The above-mentioned storage medium includes: various media capable of storing program codes such as a removable storage device, a ROM, a RAM, a magnetic disk or an optical disc.

The above is only the specific implementation mode of the present disclosure and not intended to limit the scope of protection of the present disclosure. Any variations or replacements apparent to those skilled in the art within the technical scope disclosed by the disclosure shall fall within the scope of protection of the present disclosure. Therefore, the scope of protection of the present disclosure shall be subjected to the scope of protection of the claims.

What is claimed is:

1. A data processing method, applied in a system comprising an Ethernet switching chip, an optical module and a Printed Circuit Board (PCB), wherein the optical module comprises multiple Physical Medium Dependence Lane (PMDL) physical link ports, the Ethernet switching chip comprises multiple Physical Coding Sublayer (PCS) channels and multiple Physical Medium Attachment Lanes (PMALs), each PCS channel comprising one or more Physical Coding Sublayer Lane (PCSL) links, each PMAL corresponding to one first data transmission channel, and the multiple PMALs and the multiple PDML physical link ports are connected with each other on the PCB, the data processing method comprising:
   receiving first data comprising multiple pieces of second data, wherein each piece of second data carries a channel identifier of the PCS channel that sends the second data, and a link identifier of the PCSL link that sends the second data;
   transmitting each piece of second data to a first data transmission channel whose configured channel identifier and link identifier respectively match the channel identifier and the link identifier carried by the piece of second data, wherein the channel identifier and the link identifier of the first data transmission channel are configured according to link cross information that indicates a cross connection relationship between the multiple PMALs and the multiple PDML physical link ports on the PCB, so that the channel identifier and the link identifier of the first data transmission channel are respectively consistent with the channel identifier of the PCS channel and the link identifier of the PCSL link with which the PMDL physical link port connected to the corresponding PMAL is expected to correspond; and
   sending the piece of second data of the first data transmission channel to the corresponding PMAL, so that the corresponding PMAL sends the piece of second data to the connected PMDL physical link port.

2. The method according to claim 1, wherein in a case where the link cross information indicates that an mth PMAL is connected to an nth PDML physical link port, m and n being positive integers,
   the channel identifier of the first data transmission channel corresponding to the mth PMAL is consistent with the channel identifier of the PCS channel comprising an nth PCSL link that is expected to correspond with the nth PMDL physical link port.

3. The method according to claim 1, wherein in a case where the link cross information indicates that an mth PMAL is connected to an nth PDML physical link port, m and n being positive integers,
   the link identifier of the first data transmission channel corresponding to the mth PMAL is consistent with the link identifier of an nth PCSL link that is expected to correspond with the nth PMDL physical link port.

4. A data processing method, applied in a system comprising an Ethernet switching chip, an optical module and a Printed Circuit Board (PCB), wherein the optical module comprises multiple Physical Medium Dependence Lane (PMDL) physical link ports, the Ethernet switching chip comprises multiple Physical Coding Sublayer (PCS) channels and multiple Physical Medium Attachment Lanes (PMALs), each PCS channel comprising one or more Physical Coding Sublayer Lane (PCSL) links, each PMAL corresponding to one second data transmission channel, and the multiple PMALs and the multiple PDML physical link ports are connected with each other on the PCB, the data processing method comprising:
   receiving, at the multiple PMALs, multiple pieces of third data transmitted through the multiple MPDL physical link ports, wherein each piece of third data carries a channel identifier and a link identifier;
   configuring, according to the channel identifier carried in each piece of third data, a channel identifier of the second data transmission channel corresponding to the PMAL that receives the piece of third data;
   receiving request information from a data reconstitution link, wherein the request information carries a channel identifier; and
   sending, according to the channel identifier carried in the request information, third data transmitted over one or more second data transmission channels having the channel identifier matching the channel identifier carried in the request information to the data reconstitution link which sends the request information.

5. The method according to claim 4, wherein configuring, according to the channel identifier carried in each piece of third data, a channel identifier of the second data transmission channel corresponding to the PMAL that receives the piece of third data comprises:
   configuring the channel identifier of the second data transmission channel corresponding to the PMAL that receives the piece of third data to be equal to the channel identifier carried in the piece of third data.

6. A data processing apparatus, applied in a system comprising an Ethernet switching chip, an optical module and a Printed Circuit Board (PCB), wherein the optical module comprises multiple Physical Medium Dependence Lane (PMDL) physical link ports, the Ethernet switching chip comprises multiple Physical Coding Sublayer (PCS) channels and multiple Physical Medium Attachment Lanes (PMALs), each PCS channel comprising one or more Physical Coding Sublayer Lane (PCSL) links, each PMAL corresponding to one first data transmission channel, and the multiple PMALs and the multiple PDML physical link ports are connected with each other on the PCB, the data processing apparatus comprising a memory, a processor, and an executable program stored in the memory and capable of being run by the processor, wherein the executable program comprises the following program units:
- a first receiving unit, adapted to receive first data comprising multiple pieces of second data, wherein each piece of second data carries a channel identifier of the PCS channel that sends the second data, and a link identifier of the PCSL link that sends the second data;
- a data strobe unit, adapted to transmit each piece of second data to a first data transmission channel whose configured channel identifier and link identifier respectively match the channel identifier and the link identifier carried by the piece of second data, wherein the channel identifier and the link identifier of the first data transmission channel are configured according to link cross information that indicates a cross connection relationship between the multiple PMALs and the multiple PDML physical link ports on the PCB, so that the channel identifier and the link identifier of the first data transmission channel are respectively consistent with the channel identifier of the PCS channel and the link identifier of the PCSL link with which the PMDL physical link port connected to the corresponding PMAL is expected to correspond; and
- a data distribution unit, adapted to send the piece of second data of the first data transmission channel to the corresponding PMAL, so that the corresponding PMAL sends the piece of second data to the connected PMDL physical link port.

7. The apparatus according to claim 6, wherein the executable program further comprises the following program unit:
- a configuration unit, adapted to configure, in a case where the link cross information indicates that an mth PMAL is connected to an nth PDML physical link port, m and n being positive integers, that the channel identifier of the first data transmission channel corresponding to the mth PMAL is consistent with the channel identifier of the PCS channel comprising an nth PCSL link that is expected to correspond with the nth PMDL physical link port.

8. The apparatus according to claim 6, wherein the executable program further comprises the following program unit:
- a configuration unit, adapted to configure, in a case where the link cross information indicates that an mth PMAL is connected to an nth PDML physical link port, m and n being positive integers, that the link identifier of the first data transmission channel corresponding to the mth PMAL is consistent with the link identifier of an nth PCSL link that is expected to correspond with the nth PMDL physical link port.

9. A data processing apparatus, comprising: a memory, a processor, and an executable program stored in the memory and capable of being run by the processor, wherein the processor executes the steps of the data processing method according to claim 4 when running the executable program.

10. A non-transitory storage medium, storing an executable program, wherein the executable program, when executed by a processor, implements the data processing method according to claim 1.

11. A non-transitory storage medium, storing an executable program, wherein the executable program, when executed by a processor, implements the data processing method according to claim 4.

* * * * *